(No Model.)

G. D. PAUL & F. A. KAMPFE.
ELECTRICAL CAR BRAKE.

No. 264,475. Patented Sept. 19, 1882.

WITNESSES
INVENTOR

UNITED STATES PATENT OFFICE.

GEORGE D. PAUL, OF ORANGE, NEW JERSEY, AND FREDERICK A. KAMPFE, OF BROOKLYN, NEW YORK, ASSIGNORS TO SAID PAUL, KAMPFE BROS., OF NEW YORK, WILLIAM LISLE, JR., OF BROOKLYN, AND GEORGE S. FERRY, OF NEW YORK, N. Y.

ELECTRICAL CAR-BRAKE.

SPECIFICATION forming part of Letters Patent No. 264,475, dated September 19, 1882.

Application filed November 26, 1881. (No model.)

*To all whom it may concern:*

Be it known that we, GEORGE D. PAUL, of Orange, in the county of Essex and State of New Jersey, and FREDERICK A. KAMPFE, of Brooklyn, in the county of Kings and State of New York, have invented certain new and useful Improvements in Electrical Brakes for Cars; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

Our invention relates to an improvement in electric brakes for cars, the object being to do away with the elaborate braking systems now employed and substitute therefor a very simple brake operated by an electric current and controlled by the manipulation of any suitable device for closing and breaking the said current.

With these objects in view our invention consists in certain details of construction and combinations of parts, as will be hereinafter described, and pointed out in the claims.

Figure 1:
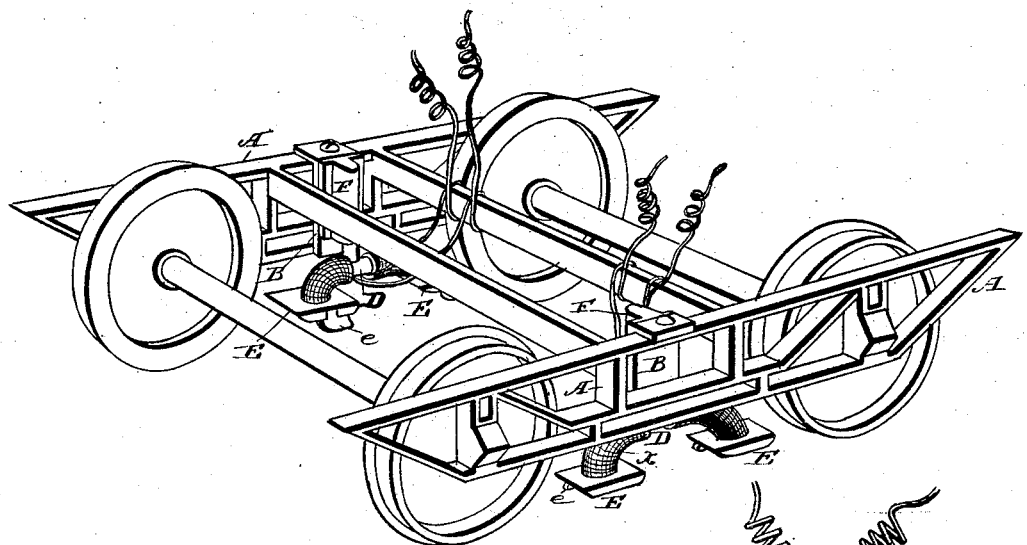
Figure 2:
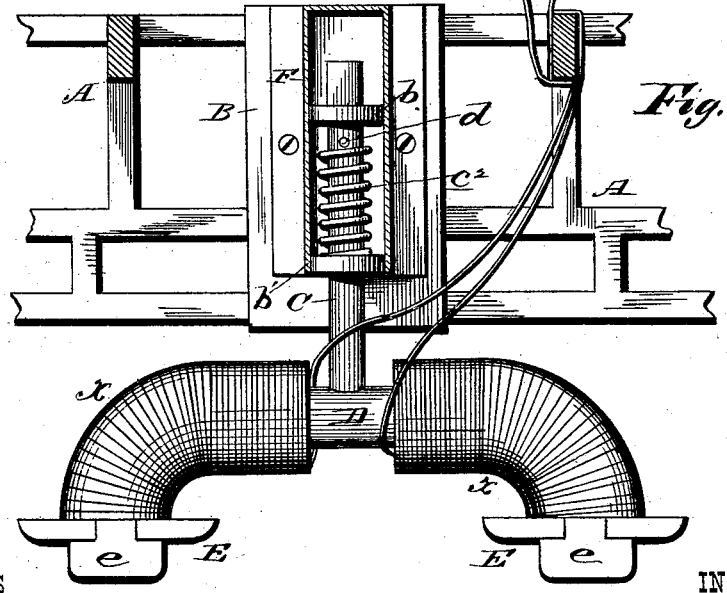

In the accompanying drawings, Figure 1 is a view in perspective of a car-truck provided with brake-shoes constructed in accordance with our invention, and Fig. 2 is a view in detail of one of our improved brakes.

A represents a car-truck of any desired construction, to which are secured at points midway between the wheels, and preferably upon the inner sides of the truck-frame, vertical plates B. The latter are each provided with two perforated lugs, $b\ b'$, projecting inwardly from said plate and adapted to receive a rod, C, supporting the brake arms and shoes. A spiral spring, $c^2$, surrounds each of said rods C, one end of the spring bearing against the lug $b'$, while the other end bears against a short transverse pin, $d$, passing through the rod C at a point near the upper end of the latter and just below the lug $c$.

D D represent the brake-arms, secured at a central point to the rods C, and provided at their lower ends with brake-shoes E, each of which has upon its inner side a guard-flange, $e$, to insure the retention of the shoes upon the rails. A casing, F, preferably of sheet metal, is secured to the plate B, to cover the lugs $c\ c'$ and spiral spring $c^2$, and thus protect them from dust, dirt, &c. The brake-arms D are of horseshoe form, as shown, and are heavily wound with insulated wire $x$, so that when a current of electricity is passed through the wire coil the brake-arms will form horseshoe-magnets. The wires from the coils are then passed forward under the cars (being properly supported and provided with suitable couplings) to the locomotive, where they will be connected to a battery or a dynamo-electric machine, or other device for generating electricity. The wires are also provided with any suitable device for breaking the current of electricity.

The operation of our improved brake is as follows: The brake-arms are normally held above the rails, free from contact with the latter, by the spiral springs $c^2$. When it is desired to apply the brake, a current of electricity is allowed to pass through the wires and coils, thus magnetizing the brake-arms, which will at once be drawn down in contact with the rails, and the powerful friction of the brake-shoes upon the rails will cause a stoppage of the train. The force of the electrical current and the resultant frictional contact of the brake-shoes with the rail may be regulated as desired. When a very gradual stoppage of a train provided with our improved brake is desired, the motive current may be so applied as to produce a slight frictional contact, which may gradually be strengthened by increasing the current of electricity. The means shown for supporting the brake-arms allow the latter to have a slight lateral movement to adapt them for slight variations or roughness in the road.

It will be observed that by our improvement all complicated and cumbersome mechanism is avoided, and a brake produced which may be easily operated by the engineer or other employé on a train with thoroughly reliable results.

We do not limit ourselves to the precise construction shown in the drawings; but many slight changes in the details of construction may be resorted to without departing from the spirit of our invention; and it will be evident that the construction hereinbefore described might be so varied as to apply the brake-shoes to the wheels of the truck instead of to the track, without departing from the principle of our invention.

Having fully described our invention, what we claim, and desire to secure by Letters Patent, is—

1. In an electrical car-brake, the combination, with the frame of a truck, of a supporting-plate secured to said frame and provided with lugs, a supporting-rod inserted in said lugs, a spiral spring surrounding the rod and interposed between the lugs, brake-arms secured to the rod and wound with wire arranged to convert the brake-arms into an electro-magnet when a current of electricity is passed through it, and guard-flanges attached to the lower extremities of the brake-arms, substantially as set forth.

2. In a car-brake, the combination, with the truck-frame, of brake-arms supported upon the sides of the latter, and provided with brake-shoes having guard-flanges, substantially as set forth.

3. In an electrical car-brake, the combination, with the frame of a truck, of the plates B, secured midway between the wheels, and provided with the perforated lugs $b$, the supporting-rod C, spiral spring $c^2$, brake-arms D D, wound with wire, arranged to convert the brake-arms into an electro-magnet when a current of electricity is passed through it, and brake-shoes E, provided with the depending guard-flanges $e$, substantially as set forth.

In testimony that we claim the foregoing we have hereunto set our hands.

GEORGE D. PAUL.
FREDERICK A. KAMPFE.

Witnesses:
JOS. H. SMALL,
OTTO KAMPFE.